United States Patent Office 3,188,732
Patented June 15, 1965

3,188,732
DIFFUSION-BONDING OF METAL MEMBERS
William Feduska, Emsworth, and Walter L. Horigan, Jr., Monroeville, Pa., assignors to Westinghouse Electric Corporation, East Pittsburgh, Pa., a corporation of Pennsylvania
No Drawing. Filed Jan. 14, 1960, Ser. No. 2,358
4 Claims. (Cl. 29—471.1)

This invention is directed to a method of diffusion-bonding high-temperature alloy members, and to alloys suitable for carrying a diffusible element for use in practicing the method.

High-temperature alloys are at present generally brazed with relatively low melting, nickel-base brazing alloys. These nickel-base brazing alloys which melt within the range of 1000° C. to 1200° C. usually contain chromium, silicon, boron, carbon, and iron as additional elements. Although these alloys perform satisfactorily in numerous brazing applications, they do have certain disadvantages particularly as the result of the silicon, boron, and carbon they contain. For example, these commercial high-temperature brazing alloys are inherently hard and brittle, and the joints brazed with these alloys tend to exhibit these same properties. It is also true, that boron, which, as indicated, is present in some of these alloys, is capable of diffusion along the grain boundaries of austenitic type alloys where it reacts to form a boride grain boundary network. This boride network is hard and brittle, and may lead to failure of the brazed joint when it is subjected to dynamic stresses during high-temperature service.

It is manifest that if a high-temperature alloy joint could be produced without introducing the undesirable elements present in currently available commercial brazing alloys, at least some of the objectionable features of high-temperature alloy brazing could be avoided. In a copending application, Serial No. 855,530, filed November 27, 1959, and now matured to U.S. Patent No. 3,145,466, issued August 25, 1964, which is assigned to the assignee of the present invention, there is disclosed the use of beryllium as a diffusible element suitable for use in diffusion-bonding. In that disclosure element beryllium is placed upon the surfaces to be joined either by painting the surfaces with a suitable beryllium containing slurry, or by a vapor deposition process. While these techniques have produced successful joints by diffusion-bonding, certain limitations are inherent therein. The vapor deposition technique is costly and relatively slow, while the thickness of the beryllium-containing deposited layer produced by either process is somewhat difficult to accurately control and measure, and hence, the amount of beryllium available at the interface for diffusion-bonding is difficult to predetermine.

This invention is concerned with overcoming the limitations of other techniques of diffusion-bonding using beryllium, by employing a technique which inherently provides precise control of the amount of diffusible element available at the joint interface for diffusion-bonding.

Accordingly, it is a primary object of this invention to provide a method for joining high-temperature alloy members by diffusion-bonding, in which the highly diffusible element beryllium is provided in an alloy in a form suitable for preplacing at the joint interface.

It is another object of this invention to provide a relatively thin metal alloy sheet in which the diffusible element beryllium is present as a minor but essential constituent of the alloy.

Other objects and advantages of the invention will in part be obvious, and will, in part, appear hereinafter.

This invention is directed to a diffusion-bonding process suitable for use with many high-temperature alloys for joining such alloy members into structures suitable for use at elevated temperatures. The method generally comprises the steps of, assembling in sandwich fashion at least two high-temperature alloy members with a thin sheet of beryllium-containing alloy between them, heating the assembly in a protective environment at a temperature of from about 900° C. to 1250° C. for from about one minute to five hours. The beryllium present in the alloy sheet diffuses in the high-temperature alloy members forming a metallurgical bond comprising a strong beryllium-containing alloy joint. The joint may be characterized by grain growth across the interfaces.

Broadly, the alloys of this invention comprise, by weight, from 0.25% to 3.75% beryllium and the balance at least 95% total of one or more elements selected from the group consisting of nickel, chromium, and iron, with small amounts of incidental impurities. More particularly, suitable beryllium-containing alloys for use in diffusion-bonding comprise, by weight, from 0.25% to 3.75% beryllium, and the balance essentially nickel with small amounts of incidental impurities.

The protective environment utilized in the bonding operation may be vacuum, or atmospheres of argon, helium, or hydrogen with a dew point of −50° C. or less.

In carrying out this invention, beryllium-containing diffusion alloys are initially melted and cast and then worked to provide sheet material, for example, foil, strip or the like. The following specific examples illustrate the preparation of sheets.

PREPARATION OF NICKEL-BERYLLIUM ALLOY SHEET

Two heats of the diffusion-bonding alloy are prepared by induction melting in magnesium oxide crucibles under an argon atmosphere. The first, identified as Heat 2140, contained 1.51 weight percent beryllium, the balance being nickel with small amounts of impurities, and the second Heat 2141, contained 3.02 weight percent beryllium and the balance being nickel with small amounts of impurities. Each heat was cast into an ingot 1½ inch in diameter by 4⅞ inches long. The ingot was forged at about 1090° C. (2000° F.) and thus reduced to plate, ⅜ inch thick by 2 inches wide by 10½ inches long. The plate was then hot rolled, at 1000° C. to 1090° C. (1830° F. to 2000° F.), down to ¼ inch thick plate, using 20–30 mil reductions per pass. After a one minute anneal of the resulting ¼ inch plate at 1000° C., the plate was hot rolled further, using 5 to 10 mils reductions per pass and intermediate anneals at 1000° C., down to strip of 10 mils thickness. This strip was annealed, at 1090° C. for one-half minute, and then cold rolled, with 1 mil reductions per pass, to about .005 to .008 inch thickness. This strip was polished to obtain a .004 inch thickness and, after being degreased was ready for use in the diffusion-bonding process.

THE DIFFUSION-BONDED JOINTS

In Table I, below, are set forth the compositions of the various high-temperature alloys which were diffusion-bonded by the process of this invention.

Table I.—Compositions of high temperature alloys bonded

| Alloys | Cr | Ni | Co | Mo | W | Cb | Zr | Ti | Al | Mn | Si | C | Fe | B |
|---|---|---|---|---|---|---|---|---|---|---|---|---|---|---|
| AISI 410 | 11.5-13.5 | | | | | | | | | | | .15 max | Bal | |
| AISI 347 | 17.0-19.0 | 9.0-12.0 | | | | 10×C | | | | | | .08 max | Bal | |
| Alloy D | 13.5 | 26.0 | | 2.75 | | | | 1.75 | 0.1 | 0.9 | 0.8 | .04 | Bal | |
| Alloy I | 15.0 | 73.0 | | | | 1.0 | | 2.5 | 0.7 | 0.5 | 0.4 | .04 | Bal | |
| Alloy H | 20.0 | 10.0 | Bal. | | 15.0 | | | | | 1.5 | 1.0 max | .15 max | 7.0 | |
| Alloy N | | 22.9 | 73.0 | | | | | | | 0.45 | 0.21 | | 3.0 max | |
| Alloy NT | 12.0 | Bal. | 10.0 | | 8.0 | | .05 | 1.87 4.0 | .26 4.0 | | | .01 .10 | .23 | .05 |

EXAMPLE I

Single-lap joint specimens of each of the alloys of Table I except Alloy NT, were prepared. Each leg of the lap joint comprised an alloy specimen measuring about 1/8 inch by 3/8 inch by 2 inches. Joint overlaps were held to 1½ times the base metal thickness, or 3/16 inch. The .004 inch thick strip of Heat 2140 nickel-beryllium alloy was preplaced between the base metal legs of the lap joint. A small 3/8 inch diameter by ½ inch long stainless steel weight block was placed on top of the base metal, at the overlap, to maintain contact between the alloy sheet and the sample legs. The joint assembly was positioned on an alumina base. The assembly was placed inside a Vycor tube and within an induction coil. The tube was then sealed and evacuated to less than 0.1 micron of mercury pressure. The specimens were then heated in the tube by operation of the induction coil to a temperature of about 1150° C. for about five minutes and then cooled to room temperature and removed from the tube.

EXAMPLE II

The procedure of Example I was repeated using Heat 2141 as the bonding alloy. In addition, double lap joints of Alloy NT were made.

The alloys of Heats 2140 and 2141 successfully produced diffusion-bonded lap joints with all the base metals of Table I (except as noted above) following the procedures indicated for Examples I and II. A slight fusion reaction was observed when Heat 2141 sheet material was employed. This was perhaps the result of the small amount of nickel-beryllium eutectic in this alloy (estimated at about 10%) fusing at 1157° C., the eutectic temperature. The slight fusion tends to establish more intimate contact of the faying surfaces with the bulk of the preplaced nickel-beryllium alloy. All the joints were tested in shear at room temperature and the results of those tests appear in Table II.

Table II.—Shear Strength Data

SINGLE-LAP JOINTS

| Base metal | Nickel-beryllium alloy | Shear strength, p.s.i. | Remarks |
|---|---|---|---|
| AISI 410 | Heat 2140 | 31,500 | |
| AISI 347 | do | 33,300 | |
| Alloy D | do | 31,850 | |
| Alloy I | do | 35,850 | |
| Alloy H | do | 43,350 | |
| Alloy N | do | 17,200 | |
| AISI 410 | Heat 2141 | 46,550 | |
| AISI 347 | do | 39,600 | |
| Alloy D | do | [1] 38,700 | Broken in parent metal. |
| Alloy I | do | [1] 72,900 | Do. |
| Alloy H | do | 31,250 | |
| Alloy N | do | 54,900 | |

DOUBLE-LAP JOINTS

| Alloy NT | Heat 2141 | 65,500 49,200 [2] 71,800 | |

[1] Actual shear strength of the joint would be somewhat higher.
[2] One leg broke in base metal, one leg at brazement.

It will be observed from Table II that Heat 2140 produced diffusion-bonded joint shear strengths varying from 17,200 p.s.i. for Alloy N to 43,350 p.s.i. for Alloy H. Heat 2141 produced shear strengths varying from 31,250 p.s.i. for Alloy H to 72,900 p.s.i. for Alloy I. These data demonstrate the high shear strengths of diffusion-bonded joints when nickel-beryllium alloy is used as the beryllium carrier. The higher shear strength values obtained with Alloy 2141 may be attributed to the slight fusion reaction mentioned previously which, it is thought, provided better coupling for the beryllium diffusion across the preplaced nickel-beryllium alloy sheet to the base metal. It should be noted that this slight fusion of a minor component of the alloy sheet, ordinarily not exceeding 15% of the alloy mass, occurs without any melting of the main body of the alloy sheet. Heat 2140 sheet did not undergo any visible fusion reaction, and, significantly, exhibited a lower range of shear strength values.

From the data presented it was concluded that while a nickel-beryllium diffusion-bonding alloy containing 3.0 weight percent beryllium is to be preferred for bonding high-temperature alloys, a nickel-beryllium alloy containing 1.5 weight percent beryllium is satisfactory in similar applications. Further, alloys with smaller amounts of beryllium than 1.5% will be satisfactory.

The diffusion-bonding heat treatment conditions employed in making the bonds of this invention, particularly the temperature of treatment and time at temperature, are related to the composition of the diffusion-bonding alloy. For example, when the diffusion-bonding alloy includes from .25% to 1% beryllium, balance nickel, the range of practical heat treatment will be from about 1000° C. for one hour to 1250° C. for five minutes. When the diffusion-bonding alloy contains from about 1% to 2% beryllium the practical range of heat treatment will be from about 900° C. for five hours to 1150° C. for five minutes, and in the composition range from 2% to 3.75% beryllium the heat treatment range will be from about 900° C. for five hours to 1150° C. for one minute. Since metal-to-metal contact is required for diffusion, pressure may be applied to the members to be joined to secure better contact, but this is not mandatory.

An improved relatively simple method has thus been developed for producing beryllium diffusion-bonded joints in high-temperature alloys for high-temperature service. The method described above employs ductile nickel-beryllium alloy sheet as a carrier for the beryllium and involves preplacing the nickel-beryllium sheet at the interface between the high-temperature base metals which are to be joined. Since the nickel-beryllium sheet is relatively ductile, it can be preformed in many desired contours to conform to complex shaped joints. The method may be employed to diffusion-bond the skin and core components of large area honeycombs, particularly cylindrically-shaped honeycombs, where molten brazing alloys tend to flow down to the bottom of the joint interface giving rise to non-uniform filleting. In addition to the alloys listed in Table I, successful joints have been diffusion-bonded with the nickel-beryllium bonding alloys of this invention, where the high-temperature alloy members were formed from the alloy known as 17-7PH which has the composition range: 16.00% to 18.00% chromium, 6.50% to 7.75% nickel, 0.75% to 1.50% aluminum, 1% silicon (max.), 1% manganese (max.), .09% carbon (max.), and the balance essentially iron. The 17–7PH is an alloy commonly used to form skins of honeycomb structures.

In addition to nickel-beryllium sheet, two beryllium-containing diffusion bonding alloys having higher strength at elevated temperatures have been prepared. These alloys have the following compositions in weight percent:

Table III

|  | Ni | Cr | Fe | Be | Mn | C |
|---|---|---|---|---|---|---|
| Heat 2414 | 76.7 | 20 |  | 3 | 0.3 |  |
| Heat 2415 | 77.3 | 13.6 | 5.8 | 2.9 | 0.3 | 0.1 |

Alloys of the Heat 2414 type fall in the composition range: 18% to 22% chromium, 0.25% to 3.75% beryllium, and the balance essentially nickel except for incidental impurities. Alloys of the Heat 2415 type have the composition range: 10% to 15% chromium, 3% to 7% iron, 0.25% to 3.75% beryllium, and the balance essentially nickel except for incidental impurities.

Heat 2414 alloy has been used successfully to bond the following alloys of Table I:

| AISI 410 | Alloy I |
| AISI 347 | Alloy N |
| Alloy D | Alloy NT |

Heat 2415 alloy has been used successfully to bond the following alloys of Table I:

| AISI 410 | Alloy D |
| AISI 347 | Alloy I |

The alloys of Table III are examples of compositions falling within the following broad range of alloy compositions which form a part of this invention:

Table IV

| Element: | Weight percent |
|---|---|
| Nickel | 55–90 |
| Chromium | 9–40 |
| Iron | 0–7 |
| Beryllium | 0.25–3.75 |
| Manganese | .15–1.00 |

The manganese indicated as present in these alloys is the result of the melting practice, and does not constitute an indispensible ingredient of the alloys.

The effectiveness of beryllium-containing alloys for diffusion bonding has been established. Broadly speaking, metals or alloys capable of holding beryllium in solid solution and exhibiting reasonable ductility may be usefully employed as diffusion-bonding alloys as illustrated in this description. The elements silver, cobalt, copper, iron, molybdenum, palladium, and platinum, have the ability to retain beryllium in solid solution over a wide range of temperatures, while titanium and zirconium can retain beryllium in solid solution at elevated temperatures. Therefore, depending upon the joint properties required, any of these may be used as the base material for diffusion-bonding alloys. Furthermore, combinations of two or more of these elements, as found in commercial alloys, may also be used as carriers for the beryllium.

Because beryllium is in solid solution or is otherwise uniformly distributed in the alloys of this invention, precise control of the quantity of beryllium available for diffusion is achieved merely by altering the composition of the alloy.

While sheet of up to .025 inch may be used to obtain diffusion-bonded joints in accordance with this invention, the thinner sheets provide stronger joints, and the preferred range of sheet thickness is .0005 inch to .005 inch. As it is used in this description and the claims the word "sheet" includes strip and foil.

Although the present invention has been described with particular reference to preferred embodiments, it will be apparent to those skilled in the art that variations and modifications may be made without departing from the essential spirit and scope of the invention. It is intended to include all such variations and modifications.

We claim as our invention:

1. In a diffusion-bonding process for joining alloy members into structures suitable for use at elevated temperatures, the steps comprising, positioning a thin beryllium-containing alloy sheet between and in intimate contact with the alloy members at the surfaces to be joined, heating the assembled members and the sheet in contact with each other in a protective environment at a temperature of from 900° C. to 1250° C. so that said members and sheet remain substantially in the solid state for a period of from about one minute to five hours, whereby the beryllium diffuses into the adjacent contacting surfaces of the members and thereby metallurgically bonds the alloy members in a strong joint, the beryllium-containing alloy sheet being of a thickness of up to 0.025 inch and comprising, by weight, from 0.25% to 3.75% beryllium, and the balance at least 95% total of at least one element selected from the group consisting of nickel, chromium, and iron, with small amounts of incidental impurities.

2. A duffusion-bonding process for joining alloy members into a structure suitable for use at elevated temperatures, the method comprising the steps of, positioning a thin nickel-beryllium alloy sheet between the alloy members at the interfaces to be joined to form the desired structure, said alloy comprising from 0.25% to 3.75% beryllium and the balance being essentially nickel, heating the structure in a protective environment at a temperature of from 900° C. to 1250° C. in substantially the solid state for from about one minute to five hours, whereby the beryllium diffuses into the alloy members at the interfaces and thereby metallurgically bonds the alloy members in a strong joint.

3. The method of claim 2 in which the nickel beryllium alloy sheet is of a thicknesss of from 0.0005 to 0.025 inch.

4. A method for assembling high temperature honeycomb structures comprising the steps of preplacing a thin sheet of beryllium-containing alloy in contact with the skin members and the core of the honeycomb, the alloy sheet comprising from 0.25% to 3.75% beryllium, and at least 95% total of one or more elements selected from the group consisting of nickel, chromium, and iron, with small amounts of impurities, heating the honeycomb assembly in a protective environment to a temperature of from 900° C. to 1250° C. for from one minute to five hours with the sheet, skin and core remaining substantially in the solid state, thereby bonding the skin members and core together by diffusion at the contacting surfaces.

References Cited by the Examiner

UNITED STATES PATENTS

| 952,290 | 3/10 | Whitney. |
| 1,713,766 | 5/29 | Mashall et al. |
| 1,898,487 | 2/33 | Hurley _____ 75—150 XR |
| 1,945,653 | 2/34 | Masing et al. |
| 2,095,807 | 10/37 | Gier _____ 29—487 |
| 2,240,064 | 4/41 | Allen et al. |
| 2,289,566 | 7/42 | Adamoli _____ 75—170 |
| 2,310,568 | 2/43 | Atlee et al. _____ 29—487 |
| 2,406,310 | 8/46 | Agule _____ 29—504 XR |

(Other references on following page)

UNITED STATES PATENTS

| | | | |
|---|---|---|---|
| 2,714,760 | 8/55 | Boam et al. | 29—494 XR |
| 2,844,867 | 7/58 | Wernz et al. | 29—504 XR |
| 2,901,346 | 8/59 | Huddle et al. | |
| 2,944,504 | 7/60 | Herman et al. | 113—99 |
| 2,981,620 | 4/61 | Brown et al. | 75—170 |
| 3,024,109 | 3/62 | Hoppin et al. | 29—487 XR |
| 3,070,875 | 1/63 | Feduska | 29—504 XR |
| 3,073,269 | 1/63 | Hoppin et al. | 29—504 XR |
| 3,088,192 | 5/63 | Turner | 29—504 XR |

FOREIGN PATENTS 847,840   10/39   France.

OTHER REFERENCES

Beryllium as an Alloying Component, pp. 1-8, by Bass, reprint from April and May, 1946 issue of Industrial Plastics.

JOHN F. CAMPBELL, *Primary Examiner.*

WHITMORE A. WILTZ, *Examiner.*